United States Patent
Cox et al.

(10) Patent No.: US 6,974,554 B2
(45) Date of Patent: Dec. 13, 2005

(54) POTTING METHOD

(75) Inventors: David John Cox, Penreth (AU); Georg Schnieder, Bad Kreuznach (DE); Fufang Zha, Westmead (AU); Joachim Muller, Thornleigh (AU); Cinzia Lea, Winston Hills (AU)

(73) Assignees: U.S. Filter Wastewater Group, Inc., Warrendale, PA (US); Pall Seitzschenk Filtersystems GmbH, Bad Kreuznach (DE)

( * ) Notice: Subject to any disclaimer, the term of this patent is extended or adjusted under 35 U.S.C. 154(b) by 25 days.

(21) Appl. No.: 10/676,458

(22) Filed: Sep. 30, 2003

(65) Prior Publication Data

US 2005/0087898 A1 Apr. 28, 2005

Related U.S. Application Data

(63) Continuation of application No. PCT/AU02/00436, filed on Apr. 4, 2002.

(51) Int. Cl.$^7$ .......................... B29C 45/14; B29C 70/76
(52) U.S. Cl. ...................... 264/40.6; 264/255; 264/263; 264/277
(58) Field of Search ................................ 264/40.6, 255, 264/261, 263, 271.1, 277, 310, 311; 425/121, 123, 127, 425, 382.2; 156/296; 96/8, 10; 210/500.23

(56) References Cited

U.S. PATENT DOCUMENTS

| | | |
|---|---|---|
| 3,228,876 A | 1/1966 | Mahon |
| 3,693,406 A | 9/1972 | Tobin |
| 3,968,192 A | 7/1976 | Hoffman et al. |
| 3,992,301 A | 11/1976 | Shippey et al. |

(Continued)

FOREIGN PATENT DOCUMENTS

| | | |
|---|---|---|
| DE | 4 117 422 | 11/1992 |
| EP | 0 463 627 B1 | 5/1995 |
| EP | 0 763 758 A1 | 10/1996 |
| EP | 920 904 A2 | 6/1999 |

(Continued)

OTHER PUBLICATIONS

U.S. Appl. No. 10/298,471, Nov. 15, 2002, Gallagher et al.
U.S. Appl. No. 10/369,813, Feb. 18, 2003, Zha et al.
U.S. Appl. No. 10/406,807, Apr. 2, 2003, Johnson et al.
U.S. Appl. No. 10/423,044, Apr. 23, 2003, Phelps.
U.S. Appl. No. 10/428,601, May 1, 2003, Zha et al.
U.S. Appl. No. 10/437,202, May 12, 2003, Muller.
U.S. Appl. No. 29/119,130, Feb. 24, 2000, Johnson et al.
Almulla et al., Desalination 153 (2002) 237–243.
Rosenberger et al., Desalination 151 (2002) 195–200.
Derwent Abstract Accession No. 2001–142268/15, J01 JP, A1, 200034932 (Mitsubishi Rayon Co. Ltd.), Dec. 12, 2000.
International Search Report in Corresponding PCT Application No. PCT/AU02/00436.

(Continued)

*Primary Examiner*—Angela Ortiz

(57) ABSTRACT

A method of forming a pot for an array of hollow fiber membranes (7) is provided, including the steps of placing the ends (6) of the fiber membranes (7) in a mould (5); forming a first layer (20) of curable resin material in a non-cured state around the fiber membrane ends (6), applying a second layer (21) of a polyurethane resin material to the first layer (20) prior to full curing of the first layer, the polyurethane resin material layer being chemically reactive with the first layer material to form an adhesive bond therebetween; at least partially curing both layers and removing the pot formed from the mould (5), wherein the second layer material is of higher flexibility than the first layer material when each layer is fully cured. Apparatus for performing the method is also disclosed.

14 Claims, 2 Drawing Sheets

U.S. PATENT DOCUMENTS

| | | | |
|---|---|---|---|
| 4,049,765 A | * 9/1977 | Yamazaki | 264/261 |
| 4,105,731 A | * 8/1978 | Yamazaki | 264/573 |
| 4,138,460 A | * 2/1979 | Tigner | 264/159 |
| 4,183,890 A | * 1/1980 | Bollinger | 264/139 |
| 4,188,817 A | 2/1980 | Steigelmann | |
| 4,190,411 A | * 2/1980 | Fujimoto | 425/434 |
| 4,192,750 A | 3/1980 | Elfes et al. | |
| 4,193,780 A | 3/1980 | Cotton et al. | |
| 4,218,324 A | 8/1980 | Hartmann et al. | |
| 4,226,921 A | * 10/1980 | Tsang | 429/104 |
| 4,227,295 A | * 10/1980 | Bodnar et al. | 29/527.3 |
| 4,248,648 A | 2/1981 | Kopp | |
| 4,359,359 A | * 11/1982 | Gerlach et al. | 156/294 |
| 4,384,474 A | 5/1983 | Kowalski | |
| 4,385,150 A | 5/1983 | Miyake et al. | |
| 4,389,363 A | * 6/1983 | Molthop | 264/135 |
| 4,414,172 A | * 11/1983 | Leason | 264/255 |
| 4,451,369 A | 5/1984 | Sekino et al. | |
| 4,511,471 A | 4/1985 | Müller | |
| 4,540,490 A | 9/1985 | Shibata et al. | |
| 4,547,289 A | 10/1985 | Okano et al. | |
| 4,609,465 A | 9/1986 | Miller | |
| 4,614,109 A | 9/1986 | Hoffmann | |
| 4,632,745 A | 12/1986 | Giuffrida et al. | |
| 4,636,296 A | 1/1987 | Kunz | |
| 4,642,182 A | 2/1987 | Drori | |
| 4,647,377 A | 3/1987 | Miura | |
| 4,650,586 A | 3/1987 | Ellis | |
| 4,656,865 A | 4/1987 | Callan | |
| 4,660,411 A | 4/1987 | Reid | |
| 4,670,145 A | 6/1987 | Edwards | |
| 4,673,507 A | 6/1987 | Brown | |
| 4,687,561 A | 8/1987 | Kunz | |
| 4,688,511 A | 8/1987 | Gerlach et al. | |
| 4,689,191 A | * 8/1987 | Beck et al. | 264/573 |
| 4,718,270 A | 1/1988 | Storr | |
| 4,744,240 A | 5/1988 | Reichelt | |
| 4,756,875 A | 7/1988 | Tajima et al. | |
| 4,763,612 A | 8/1988 | Iwanami | |
| 4,767,539 A | 8/1988 | Ford | |
| 4,779,448 A | 10/1988 | Gogins | |
| 4,784,771 A | 11/1988 | Wathen et al. | |
| 4,793,932 A | 12/1988 | Ford et al. | |
| 4,797,211 A | 1/1989 | Ehrfeld et al. | |
| 4,810,384 A | 3/1989 | Fabre | |
| 4,812,235 A | 3/1989 | Seleman et al. | |
| 4,816,160 A | 3/1989 | Ford et al. | |
| 4,846,970 A | 7/1989 | Bertelsen et al. | |
| 4,876,006 A | 10/1989 | Ohkubo et al. | |
| 4,876,012 A | 10/1989 | Kopp et al. | |
| 4,921,610 A | 5/1990 | Ford et al. | |
| 4,931,186 A | 6/1990 | Ford et al. | |
| 4,935,143 A | 6/1990 | Kopp et al. | |
| 4,999,038 A | 3/1991 | Lundberg | |
| 5,005,430 A | 4/1991 | Kibler et al. | |
| 5,024,762 A | 6/1991 | Ford et al. | |
| 5,066,375 A | 11/1991 | Parsi et al. | |
| 5,066,401 A | 11/1991 | Muller et al. | |
| 5,066,402 A | 11/1991 | Anselme et al. | |
| 5,069,065 A | 12/1991 | Sprunt et al. | |
| 5,076,925 A | 12/1991 | Roesink et al. | |
| 5,079,272 A | 1/1992 | Allegrezza et al. | |
| 5,094,750 A | 3/1992 | Kopp et al. | |
| 5,104,546 A | 4/1992 | Filson et al. | |
| H1045 H | 5/1992 | Wilson | |
| 5,137,631 A | 8/1992 | Eckman et al. | |
| 5,138,870 A | 8/1992 | Lyssy | |
| 5,151,191 A | 9/1992 | Sunaoka et al. | |
| 5,151,193 A | 9/1992 | Grobe et al. | |
| 5,158,721 A | 10/1992 | Allegrezza et al. | |
| 5,192,456 A | 3/1993 | Ishida et al. | |
| 5,192,478 A | * 3/1993 | Caskey | 264/139 |
| 5,194,149 A | 3/1993 | Selbie et al. | |
| 5,198,116 A | 3/1993 | Comstock et al. | |
| 5,209,852 A | 5/1993 | Sunaoka et al. | |
| 5,211,823 A | 5/1993 | Giuffrida et al. | |
| 5,221,478 A | 6/1993 | Dhingra et al. | |
| 5,227,063 A | 7/1993 | Langerak et al. | |
| 5,248,424 A | 9/1993 | Cote et al. | |
| 5,297,420 A | 3/1994 | Gilliland et al. | |
| 5,320,760 A | 6/1994 | Freund et al. | |
| 5,353,630 A | 10/1994 | Soda et al. | |
| 5,361,625 A | 11/1994 | Ylvisaker | |
| 5,364,527 A | 11/1994 | Zimmermann et al. | |
| 5,389,260 A | 2/1995 | Hemp | |
| 5,401,401 A | 3/1995 | Hickok | |
| 5,403,479 A | 4/1995 | Smith et al. | |
| 5,405,528 A | 4/1995 | Selbie et al. | |
| 5,417,101 A | 5/1995 | Weich | |
| 5,419,816 A | 5/1995 | Sampson et al. | |
| 5,470,469 A | 11/1995 | Eckman | |
| 5,477,731 A | 12/1995 | Mouton | |
| 5,480,553 A | 1/1996 | Yamamori et al. | |
| 5,531,848 A | 7/1996 | Brinda et al. | |
| 5,531,900 A | 7/1996 | Raghavan et al. | |
| 5,543,002 A | 8/1996 | Brinda et al. | |
| 5,554,283 A | 9/1996 | Brinda et al. | |
| 5,556,591 A | * 9/1996 | Jallerat et al. | 264/516 |
| 5,607,593 A | 3/1997 | Cote et al. | |
| 5,639,373 A | 6/1997 | Mahendran et al. | |
| 5,643,455 A | 7/1997 | Kopp et al. | |
| 5,688,460 A | * 11/1997 | Ruschke | 264/263 |
| D396,046 S | 7/1998 | Scheel et al. | |
| 5,783,083 A | 7/1998 | Henshaw et al. | |
| D396,726 S | 8/1998 | Sadr et al. | |
| D400,890 S | 11/1998 | Gambardella | |
| 5,910,250 A | 6/1999 | Mahendran et al. | |
| 5,914,039 A | 6/1999 | Mahendran | |
| 5,918,264 A | 6/1999 | Drummond et al. | |
| 5,942,113 A | 8/1999 | Morimura | |
| 5,944,997 A | 8/1999 | Pedersen et al. | |
| 6,024,872 A | 2/2000 | Mahendran | |
| 6,039,872 A | 3/2000 | Wu et al. | |
| 6,042,677 A | 3/2000 | Mahendran et al. | |
| 6,048,454 A | 4/2000 | Jenkins | |
| 6,077,435 A | 6/2000 | Beck et al. | |
| 6,083,393 A | 7/2000 | Wu et al. | |
| 6,113,782 A | * 9/2000 | Leonard | 210/321.89 |
| 6,146,747 A | 11/2000 | Wang et al. | |
| 6,156,200 A | 12/2000 | Zha et al. | |
| 6,159,373 A | 12/2000 | Beck et al. | |
| 6,193,890 B1 | 2/2001 | Pedersen et al. | |
| 6,202,475 B1 | 3/2001 | Selbie et al. | |
| 6,254,773 B1 | 7/2001 | Biltoft | |
| 6,290,756 B1 | * 9/2001 | Macheras et al. | 96/8 |
| 6,294,039 B1 | 9/2001 | Mahendran et al. | |
| RE37,549 E | 2/2002 | Mahendran et al. | |
| 6,354,444 B1 | 3/2002 | Mahendran | |
| 6,440,303 B2 | 8/2002 | Spriegel | |
| D462,699 S | 9/2002 | Johnson et al. | |
| 6,524,481 B2 | 2/2003 | Zha et al. | |
| 6,555,005 B1 | 4/2003 | Zha et al. | |
| 6,702,561 B2 | * 3/2004 | Stillig et al. | 425/120 |
| 2002/0148767 A1 | 10/2002 | Johnson et al. | |
| 2002/0153299 A1 | 10/2002 | Mahendran et al. | |
| 2002/0195390 A1 | 12/2002 | Zha et al. | |
| 2003/0075504 A1 | 4/2003 | Zha et al. | |
| 2003/0089659 A1 | 5/2003 | Zha et al. | |
| 2003/0136746 A1 | 7/2003 | Behman et al. | |

FOREIGN PATENT DOCUMENTS

| | | |
|---|---|---|
| EP | 0 920 904 A2 | 6/1999 |
| EP | 1 052 012 A1 | 11/2000 |
| FR | 2 674 448 A1 | 2/1992 |
| FR | 2 699 424 A1 | 6/1994 |
| GB | 2 253 572 A | 9/1992 |
| JP | 58-088007 | 5/1983 |
| JP | 61-097006 | 5/1986 |
| JP | 61-107905 | 5/1986 |
| JP | 61-257203 | 11/1986 |
| JP | 61-263605 | 11/1986 |
| JP | 62-004408 | 1/1987 |
| JP | 62-114609 | 5/1987 |
| JP | 62-140607 | 6/1987 |
| JP | 62-179540 | 8/1987 |
| JP | 63-097634 | 4/1988 |
| JP | 01-307409 | 12/1989 |
| JP | 02-164423 | 6/1990 |
| JP | 02-284035 | 11/1990 |
| JP | 03-018373 | 1/1991 |
| JP | 03-028797 | 2/1991 |
| JP | 31-010445 | 5/1991 |
| JP | 04-310223 | 11/1992 |
| JP | 05-023557 | 2/1993 |
| JP | 05-157654 | 6/1993 |
| JP | 06-071120 | 3/1994 |
| JP | 06-114240 | 4/1994 |
| JP | 07-000770 | 1/1995 |
| JP | 07-275665 | 10/1995 |
| JP | 08-010585 | 1/1996 |
| JP | 09-141063 | 6/1997 |
| JP | 10-156149 | 6/1998 |
| WO | WO 90/00434 | 1/1990 |
| WO | WO 96/41676 | 12/1996 |

OTHER PUBLICATIONS

Patent Abstracts of Japan, vol. 010, No. 373, Dec. 12, 1986, and JP 61 167406 A (Sumitomo Bakelite Co Ltd.), Jul. 29, 1986.
Patent Abstracts of Japan, vol. 017, No. 102, Mar. 1993, and JP 04 293527 A (Daicel Chem Ind Ltd), Oct. 19, 1992.
Patent Abstracts of Japan, vol. 014, No. 314, Jul. 5, 1990, and JP 02 107318 A (Daicel Chem Ind Ltd), Apr. 19, 1990.
Patent Abstracts of Japan, vol. 011, No. 371, Dec. 3, 1987, and JP 62 1447708 A (Daicel Chem Ind Ltd), Jun. 27, 1987.
Patent Abstracts of Japan, vol. 005, No. 195, Dec. 11, 1981, and JP 56 118701 A (Kuraray Co Ltd.), Sep. 17, 1981.
European Search Report in European Appl. No. 02 71 2648, Completed Jan. 26, 2005.

* cited by examiner

POTTING METHOD

This application is a continuation, under 35 U.S.C. §120, of International Patent Application No. PCT/AU02/00436, filed on Apr. 4, 2002 under the Patent Cooperation Treaty (PCT), which was published by the International Bureau in English on Oct. 17, 2002, which designates the United States and claims the benefit of Australian Provisional Patent Application No. PR 4215, filed Apr. 4, 2001.

FIELD OF THE INVENTION

The present invention relates to potting methods for porous hollow fibre membranes typically used in filtration systems.

BACKGROUND OF THE INVENTION

The potting materials used to support and hold arrays of porous hollow fibre membranes are usually a compromise between materials which have sufficient rigidity to provide adequate support but sufficient softness and flexibility to avoid breakage of the fibres where they enter the pot. Too rigid a material produces rapid breakage of fibres adjacent the pot while too soft a material does not have sufficient mechanical strength to adequately support the fibres. The materials are also chosen to resist breakdown as a result of exposure to various types of feed as well as cleaning fluids used to maintain the fibres.

Known systems employ single layers of epoxy, polyurethane or silicon materials, however, each suffer from the disadvantages outlined above.

The present invention seeks to overcome or at least ameliorate one or more of the disadvantages of the prior art outlined above or at least provide a useful alternative.

SUMMARY OF THE INVENTION

According to one aspect, the present invention provides a method of forming a pot for an array of hollow fibre membranes including the steps of: placing the ends of said fibre membranes in a mould; forming a first layer of curable resin material in a non-cured state around said fibre membrane ends, applying a second layer of polyurethane resin material to said first layer prior to full curing of said first layer, said second layer of polyurethane resin material being chemically reactive with said first layer material to form an adhesive bond therebetween; at least partially curing both layers and removing the pot formed from said mould, wherein said second layer material is of higher flexibility than said first layer material when each layer is filly cured.

It will be appreciated that any known method of sealing the open fibres may be used prior to the potting process described above.

Preferably, the curable resin material is an epoxy resin. The use of an epoxy resin has been found to be advantageous when potting fibre membranes which typically contain hydroscopic liquids which may produce sealing problems between the fibres and the pot when polyurethane resin is used.

In one preferred form the layer of higher flexibility is produced by adding one or more flexibilising agents to the components of the material forming the first layer of lower flexibility.

Preferably, the method includes the step of the monitoring the curing process of the first layer to determine the optimal time in which to apply the second layer thereto. For preference, the step of monitoring includes monitoring the temperature changes within said first layer to determine the state of the curing process.

It is important that the second layer be applied to the first layer prior to curing of the first layer being completed so that there are sufficient active sites available for the chemical reaction required to adhere one layer to the other can take place. Proper adhesion of the two layers is required to prevent ingress of feed between the layers and growth of bacteria etc. between the layers leading to damage and breakage of fibres and consequential contamination of the filtrate. The use of this process also eliminates the need for special adhesives and primers to produce adhesion between the layers.

A necessary condition for the adhesion of the two layers is the chemical reaction between some of the components of the two different layers. For epoxy/polyurethane layers, it is desirable that one of the epoxy components is reactive with the isocyanate groups of the polyurethane (preferably amines or amides).

According to a second aspect, the present invention provides an apparatus for potting hollow fibre membranes including:

a mould for receiving the ends of said hollow fibre membranes;

means for forming a first layer of curable resin material in a non-cured state around said fibre membrane ends in said mould, means for applying a second layer of polyurethane resin material to said first layer prior to full curing of said first layer, said second layer polyurethane resin material being chemically reactive with said first layer material to form an adhesive bond therebetween and said second layer polyurethane resin material being of higher flexibility than said first layer material when each layer is fully cured.

Preferably, the mould includes separate means for flowing said first and second layer materials into the mould. For preference, said materials are fed into a centrifuge before being flowed along a conduit or tube into the mould. Preferably, a single centrifuge may be used having separate sections to receive the respective first and second layer materials.

Although, a centrifuge is the preferred tool used in the method, it will be appreciated that other techniques such as static potting are equally applicable to the inventive method.

BRIEF DESCRIPTION OF THE DRAWINGS

A preferred embodiment of the invention will now be described, by way of example only, with reference to the accompanying drawings in which.

DETAILED DESCRIPTION OF THE PREFERRED EMBODIMENT

Figure 1:
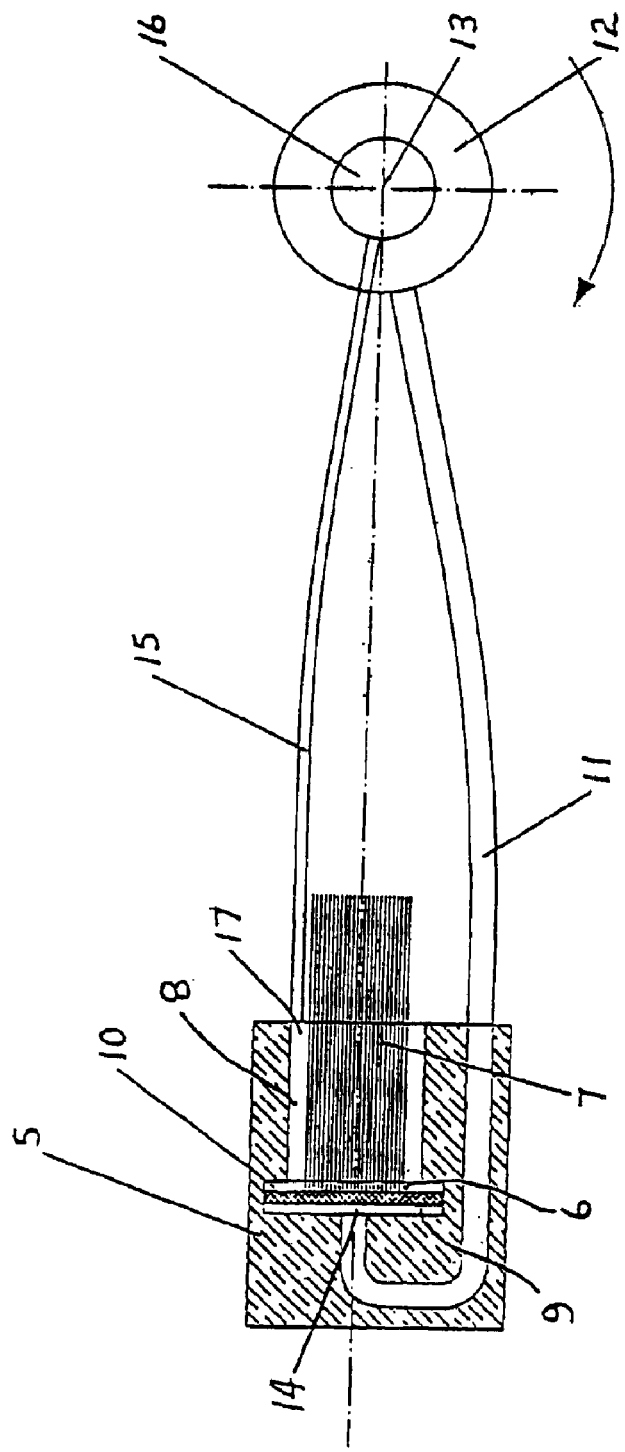
FIG. 1 shows a simplified schematic diagram of the potting apparatus used to perform the potting method in accordance with one embodiment of the present invention.

Referring to FIG. 1, the potting apparatus comprises a mould 5 for receiving the ends 6 of the fibres membranes 7. The mould 5 includes a cylindrical cavity 8 for receiving the fibre membranes 7. The cavity 8 has an enlarged-diameter base portion 9 for holding the prepot 10 which serves to support the fibres during the potting process. A tube or hose 11 connects one bowl 12 of a centrifuge 13 to the base 14 of the mould cavity 8. A second tube 15 connects a second bowl 16 of the centrifuge 13 to the upper portion 17 of the mould cavity 8.

In use, the material for forming the first relatively hard layer of the pot is dispensed into bowl 12 of the centrifuge 13 and flowed along tube or hose 11 into the lower portion 14 of the mould cavity 8 to form a first layer around the fibre ends 6. Prior to full curing of this material, a second material for forming the second softer layer is dispensed into bowl 16 and flowed along tube or hose 15 into the mould cavity 8 to apply the second layer of material to the first layer. The layers chemically react to form an adhesive bond between the first and second layers. At an appropriate curing stage the potted fibres are removed from the mould 5.

In some applications, it may be possible to use a single bowl and tube to flow the materials sequentially into the mould to form the two layers.

In order to determine the optimal time during the curing of the first layer for applying the second layer, the temperature profile of the first layer material may be monitored, at least during the initial set up of the process. The temperature profile indicates the various stages of the curing process and when the second layer may be applied to ensure that sufficient free sites are available for chemical bonding between the two layers. Once the optimal time has been determined for a particular material combination further monitoring is unnecessary.

A steep rise in temperature indicates that the majority of the curing reaction is taking place. The optimal time for the addition of the second layer has been found to be within ±5 minutes of the time of this temperature rise and preferably, ±2 minutes.

Figure 2:
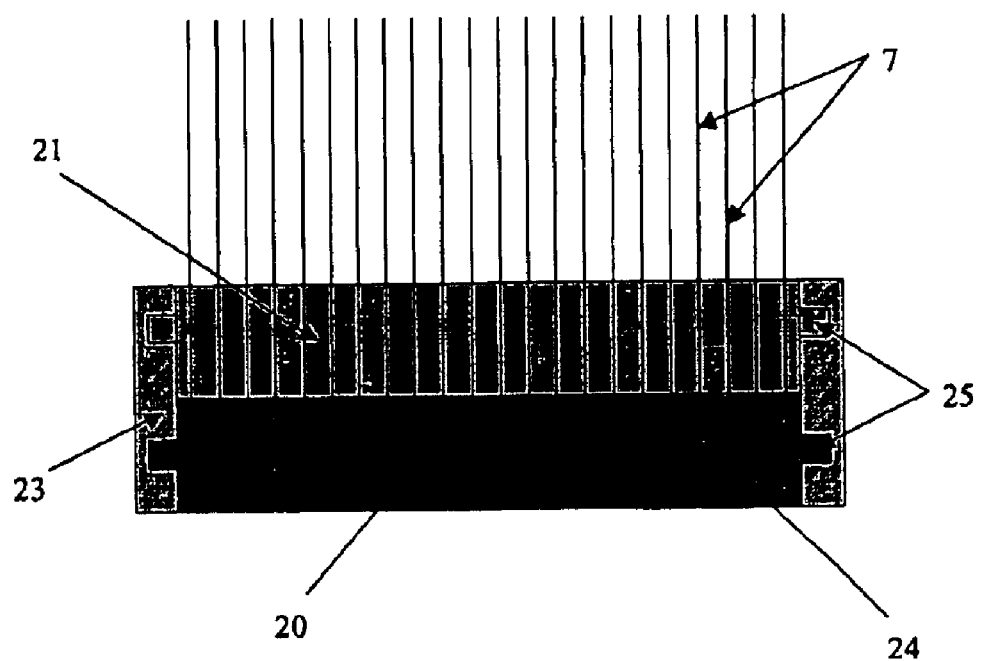
FIG. 2 shows a cross-sectional view of one potted end of the fibres illustrating one embodiment of the invention.

The embodiment shown in FIG. 2 illustrates a method using a potting sleeve 23 to enhance the interfacial binding between the potting layers 20, 21. The quantity of potting materials or the width of the potting sleeve 23 is selected to ensure that the interface 24 of the two layers is within the potting sleeve 23. The potting sleeve 23 is formed from material which ensures good adhesion between its inner surface and the two potting materials. Besides the selection is of the potting sleeve material, roughening the inner surface of the sleeve 23 can also enhance the binding of the potting materials with the sleeve 23. Further enhancement can be achieved by forming grooves 25 in the potting sleeve 23. Due to the adhesive force between the potting materials and the potting sleeve 23, it serves to reduces any movement or detachment of the two potting layers 20, 21 at the interface 24, and therefore enhances the binding of the two potting layers 20, 21.

The potting method outlined above provides a number of advantages over the prior art including improved support of the fibres serves to reduce breakages at the fibre/pot interface. In some applications it is also possible to dispense with the usual potting sleeve as the pot formed by this method has sufficient rigidity to be self-supporting. This produces a manufacturing saving as in some cases shrinkage of the potting materials relative to the potting sleeve produces gaps which are again undesirable in terms of leakage and bacterial growth. In such cases the pot must be discarded.

It will be appreciated that further embodiments and exemplifications of the invention are possible without departing from the spirit or scope of the invention described.

What is claimed is:

1. A method of forming a pot for an array of hollow fibre membranes, each fibre membrane comprising an end, the method comprising:
   placing the ends of the fibre membranes in a mould;
   forming a first layer of a curable resin material in a non-cured state around the ends, wherein the step of forming a first layer of a curable resin material further comprises monitoring a curing process of the first layer to determine an optimal time at which to apply a second layer to the first layer;
   applying a second layer of a polyurethane resin material to the first layer prior to full curing of the first layer, wherein the polyurethane resin material is chemically reactive with the curable resin material to form an adhesive bond between the first layer and the second layer, and wherein a fully cured polyurethane resin material is of a higher flexibility than a fully cured curable resin material;
   at least partially curing the first layer and the second layer, such that a pot is formed; and
   removing the pot from the mould.

2. The method according to claim 1, wherein the curable resin material comprises an epoxy resin.

3. The method according to claim 1, wherein the first layer comprises at least one flexibilising agent.

4. The method according to claim 1, wherein the step of monitoring comprises monitoring a temperature change within the first layer to determine a state of the curing process.

5. A method of forming a pot for an array of hollow fibre membranes, each fibre membrane comprising an end, the method comprising:
   placing the ends of the fibre membranes in a mold;
   providing a potting sleeve within the mould to receive a first layer and a second layer, wherein the potting sleeve comprises adhesion means, wherein the adhesion means assist in adhesion of at least one of the curable resin material and the polyurethane resin material to the potting sleeve;
   forming a first layer of a curable resin material in a non-cured state around the ends;
   applying a second layer of a polyurethane resin material to the first layer prior to full curing of the first layer, wherein the polyurethane resin material is chemically reactive with the curable resin material to form an adhesive bond between the first layer and the second layer, and wherein a fully cured polyurethane resin material is of a higher flexibility than a fully cured curable resin material;
   at least partially curing the first layer and the second layer, such that a pot is formed; and
   removing the pot from the mould.

6. The method according to claim 5, wherein a surface of the potting sleeve in contact with at least one of the curable resin material and the polyurethane resin material is roughened.

7. The method according to claim 5, wherein the potting sleeve comprises at least one protrusion formed on a surface of the potting sleeve in contact with at least one of the curable resin material and the polyurethane resin material.

8. The method according to claim 5, wherein the potting sleeve comprises at least one indentation formed on a surface of the potting sleeve in contact with at least one of the curable resin material and the polyurethane resin material.

9. A method of forming a pot for an array of hollow fibre membranes, each fibre membrane comprising an end, the method comprising:

placing the ends of the fibre membranes in a mould;

forming a first layer of a curable resin material in a non-cured state around the ends, wherein the curable resin material comprises epoxy groups;

applying a second layer of a polyurethane resin material comprising amine groups or amide groups to the first layer prior to full curing of the first layer, wherein the amine groups or amide groups of the polyurethane resin material chemically react with the epoxy groups of the curable resin material to form an adhesive bond between the first layer and the second layer, and wherein a fully cured polyurethane resin material is of a higher flexibility than a fully cured curable resin material;

at least partially curing the first layer and the second layer, such that a pot is formed; and removing the pot from the mould.

10. The method according to claim 9, wherein the first layer comprises at least one flexibilising agent.

11. The method according to claim 9, wherein the step of forming a first layer of a curable resin material further comprises monitoring a curing process of the first layer to determine an optimal time at which to apply a second layer to the first layer.

12. The method according to claim 9, further comprising the step of providing a potting sleeve within the mould to receive a first layer and a second layer, wherein the potting sleeve comprises adhesion means, wherein the adhesion means assist in adhesion of at least one of the curable resin material and the polyurethane resin material to the potting sleeve.

13. The method according to claim 9, further comprising the step of providing a potting sleeve within the mould to receive a first layer and a second layer, wherein the potting sleeve comprises at least one protrusion formed on a surface of the potting sleeve in contact with at least one of the curable resin material and the polyurethane resin material.

14. The method according to claim 9, further comprising the step of providing a potting sleeve within the mould to receive a first layer and a second layer, wherein the potting sleeve comprises at least one indentation formed on a surface of the potting sleeve in contact with at least one of the curable resin material and the polyurethane resin material.

* * * * *